Figure 1:
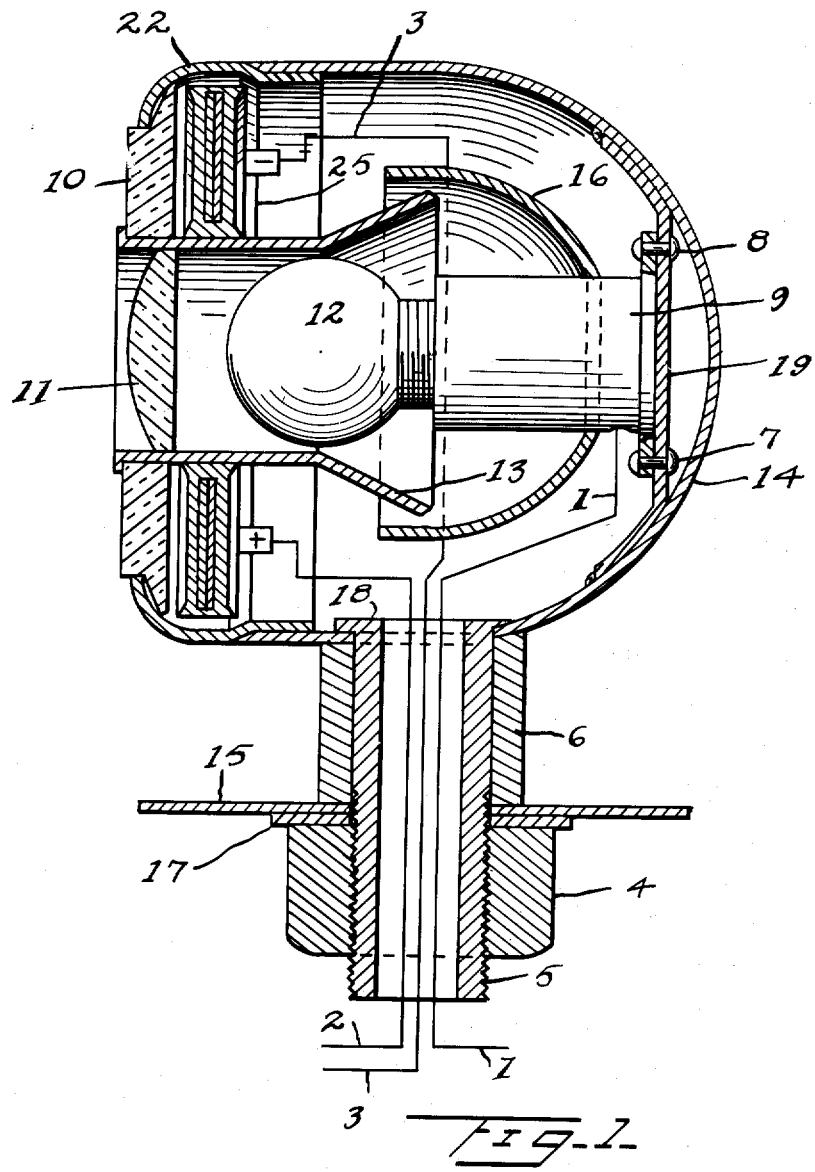

Jan. 24, 1956  J. ANDRESEN  2,732,539
ELECTRONIC DISTANCE GAUGING DEVICE FOR MOTOR VEHICLES
Filed June 18, 1952  2 Sheets-Sheet 1

INVENTOR
John Andresen
BY John N. Randolph
ATTORNEY

Jan. 24, 1956     J. ANDRESEN     2,732,539

ELECTRONIC DISTANCE GAUGING DEVICE FOR MOTOR VEHICLES

Filed June 18, 1952     2 Sheets-Sheet 2

INVENTOR
John Andresen
BY John N. Randolph
ATTORNEY

United States Patent Office 2,732,539
Patented Jan. 24, 1956

2,732,539
ELECTRONIC DISTANCE GAUGING DEVICE FOR MOTOR VEHICLES
John Andresen, Ocala, Fla.
Application June 18, 1952, Serial No. 294,289
1 Claim. (Cl. 340—61)

This invention relates to an electronic device of extremely simple construction adapted for use on motor vehicles such as automobiles, trucks and busses to enable the vehicle operator to readily and accurately determine how close the rear end of the vehicle is to an obstruction toward which the vehicle is being backed to avoid striking the obstruction.

One primary object of the invention is to provide an electronic gauging unit well adapted for use on automobiles while backing into a parking space for accurately indicating to the driver the distance between the rear end of the vehicle and another vehicle or other obstruction toward which the first vehicle is being backed so that this distance can be accurately determined by and will be indicated to the driver without the driver being required to look back.

Another object of the invention is to provide an electronic distance gauging device which may be effectively employed on trucks and busses, particularly large trailer trucks where frequently no rear visibility is available to the vehicle driver and which will indicate the distance between the rear end of the vehicle and any obstruction toward which the vehicle is being backed to avoid damage which frequently occurs in backing trucks or busses in congested areas, toward a parking space or toward a loading or unloading platform or other similar obstruction.

More particularly, it is a primary object of the present invention to provide a unit of extremely simple construction wherein a light source and photoelectric cell or electric eye are housed in a single casing and with the photoelectric eye disposed concentrically around the light source and shielded therefrom, so that only reflected light or light rays may impinge upon the photoelectric cell as supplied by said light source, and so that the intensity of the reflected light rays may be accurately indicated on a visual indicator or the like to enable a vehicle driver to accurately determine how far the rear end of a vehicle equipped with the unit is disposed from an obstruction toward which the vehicle is being backed.

Still another object of the invention is to provide an electronic distance gauging device which may be readily adjusted for use in daylight and so that the shadows or subdued light produced by an obstruction will be indicated on a visual indicator for indicating that the rear end of the vehicle is approaching an obstruction.

Still another object of the invention is to provide a unit which may be very economically manufactured and sold, which may be readily applied to a motor vehicle without detracting from the appearance thereof and which will function efficiently and accurately for indicating the distance between the rear end of the vehicle and an obstruction being approached thereby.

Figure 2:
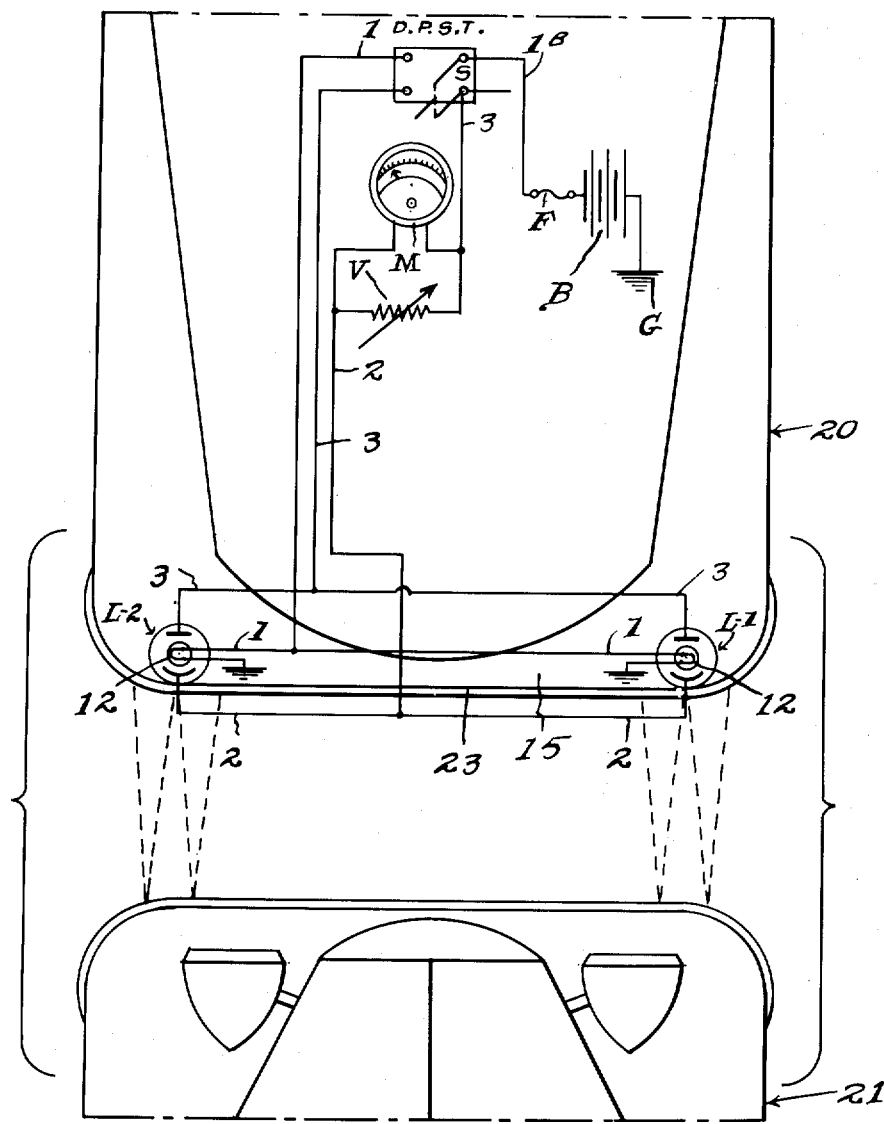

Numerous other objects and advantages of the invention will hereinafter become more fully apparent from the following description of the drawings, illustrating a presently preferred embodiment thereof, and wherein:

Figure 1 is a central vertical sectional view, partly in side elevation, showing one of the distance gauging units in an applied position, and Figure 2 is a top plan view of portions of two motor vehicles on one of which the electronic distance gauging device is mounted and illustrating diagrammatically certain of the electrical parts of the complete device including a preferred electric circuit thereof.

Referring more specifically to the drawings, for the purpose of illustrating one preferred application and use of the electronic distance gauging device, the rear portion of one motor vehicle is illustrated in Figure 2 and designated generally 20 and the front portion of another motor vehicle is illustrated and designated generally 21. The motor vehicle 20 is shown equipped with the distance gauging device including two corresponding units designated generally L–1 and L–2 which are mounted adjacent the rear end of the vehicle 20 on the vehicle portion 15 thereof and forwardly of the rear extremity of the vehicle 20 as indicated by the bumper 23 thereof.

Referring to Figure 1, each unit L–1 and L–2 includes a housing or casing 14. A hollow bolt or threaded sleeve 5 extends downwardly through the bottom portion of the housing 14 and has a flanged upper end 18 bearing against a portion of the inner side of said housing bottom portion. A spacing sleeve 6 is mounted on the bolt 5 and has its upper end bearing against a part of the bottom portion of the housing 14 and its lower end resting on the vehicle portion 15. The bolt 5 extends downwardly through said vehicle portion 15 and has a nut 4 engaging its threaded lower end. A washer 17 which is mounted on the bolt 5 is clamped by the nut 4 between said nut and the underside of the vehicle portion 15, which portion 15 is clamped between the washer 17 and the spacing sleeve 6. Likewise, the bottom portion of the housing 14 is clamped between the upper end of the sleeve 6 and the bolt flange or head 18, all as clearly illustrated in Figure 1, for rigidly mounting the housing 14 above the vehicle portion 15.

A mounting bracket 19 is suitably secured in the closed rear end of the housing 14 to provide a support for a lamp socket 9, the base of which is secured against the inner or forward side of the bracket 19 by suitable fastenings 7 and 8. The lamp socket 9 is thus disposed axially of the housing 14 and extends from the bracket 19 forwardly of said housing. A lamp bulb 12 is mounted in the forward end of the socket 9.

A substantially cup shaped reflector 16 is mounted on the socket 9 behind the light source 12 and faces toward said light source and toward the front of said housing 14. A light ray directing barrel 13 is disposed around and extends forwardly from the bulb or light source 12 and has a flared annular rear end extending rearwardly from the light bulb into the open forward end of the reflector 16. A lens 11 is mounted in and closes the barrel 13 forwardly of the light source 12 and is suitably secured to said barrel. An outer annular lens 10 is disposed around and secured to the outer side of the forward end of the barrel 13. The peripheral portion of the lens 10 fits into the outer end of a lens retaining ring 22 the inner end of which is detachably secured as by a press fit engagement in the open forward end of the housing 14, so that the retaining ring 22 supports the lens 10 and the barrel 13. An annular photoelectric cell 25 is mounted on and disposed around the barrel 13 inwardly of the lens 10 so that the photoelectric cell and the lens 11 are supported by the barrel 13. It will also be apparent that the photoelectric cell 25 is disposed directly behind the lens 10 and is thus enclosed by the housing 14, lens 10 and barrel 13. It will also be apparent that the barrel 13 forms a shield to prevent light rays from the light source 12 impinging directly against the photoelectric cell 25 which is disposed concentrically around said light source and thus shielded therefrom.

It will be obvious that each of the units L–1 and L–2 correspond to the unit as illustrated in Figure 1.

Referring to Figure 2, the motor vehicle 20 is shown equipped with the usual storage battery B which is suitably grounded to the vehicle frame as indicated at G. A conductor 1B extends from the positive side of the battery B to one terminal of a double pole single throw switch S. A conductor 1 leads from another terminal of the switch S and has branch conductor portions extending into the two housings 14 through the hollow bolts 5, as illustrated in Figure 1. The two branch conductors 1 are electrically connected to the lamp sockets 9 which are of the single contact type and are grounded through the bracket 19, housing 14 and bolt 5 to the vehicle part 15. A fuse F is preferably interposed in the conductor 1B between the battery and switch S. A positive conductor 2 has branch portions connected to the positive terminals of the two photoelectric cells 25 and said conductor 2 leads from the two photoelectric cells 25 to one contact of a meter M, said meter being a conventional microvolt movement of the type conventionally employed with a photoelectric cell or cells. A conductor 3 leads from the other contact of the meter M to another terminal of the switch S. The conductor 3 then continues from the other, fourth terminal of the switch S and has branch conductors connected to the negative terminals of the two photoelectric cells 25, as illustrated in Figure 1. The conductors 2 and 3 likewise extending through the bore of the bolt 5. The meter M also includes a shunt circuit including a wire extending between the conductors 2 and 3 in which a variable resistor or shunt is interposed, as indicated diagrammatically at V, in Figure 2.

From the foregoing it will be apparent that when the vehicle 20 is about to be backed into a parking place or toward an obstruction, the vehicle operator may move the switch S to a circuit closing position so that one blade of the switch will bridge the terminals connected to the conductors 1B and 1 and the other blade of the switch will bridge the terminals connected to the conductor portions 3. The switch S and meter M may be mounted on the dashboard of the vehicle or in any other suitable location convenient to be seen and operated by the vehicle operator when in a position to operate the vehicle. When the switch S is thus closed, the two light sources 12 will be energized and the light rays therefrom will pass directly through the lens 11 and will be reflected from the inner side of the reflector 16 and barrel 13 through said lens 11 associated with each housing 14. Accordingly, as the vehicle 20 is backing into a parking space or toward an obstruction such as the vehicle 21, as the vehicle 20 approaches the other vehicle or obstruction 21 the light rays from the two light sources 12 will be directed against the obstruction or vehicle 21 and will be reflected therefrom back toward the two housings 14. These reflected light rays will enter the housings 14 through the lenses 10 to thereby energize or excite the photoelectric cells 25. The current thus produced will pass through the conductors 2, meter M, conductors 3 and switch S constituting the photoelectric cell circuit. This current will be amplified by the built-in amplifier of the meter M and the amount of current thus passing through the meter will be indicated by movement of the needle of the meter across the meter dial away from its "zero" position. Accordingly, as the vehicle 20 approaches the vehicle or obstruction 21 the intensity of the light rays, indicated by the broken lines in Figure 2 between the vehicles, will be intensified thus increasing the current passing through the meter thereby increasing the reading on the meter. The driver of the vehicle thus without looking around will be able to determine how far the backing vehicle 20 is from the vehicle 21 and how much further the vehicle 20 may be backed without risk of striking the vehicle or obstruction 21. It will likewise be obvious that the meter M may additionally be calibrated in feet for more readily visually indicating the distance between the vehicles. Thus, the electronic distance gauging device may be accurately employed for parking the vehicle at night or for backing a vehicle toward another vehicle or other obstruction without risk of striking said obstruction or other vehicle, and may be similarly utilized on trucks or busses, in all of which uses the driver is not required to look back toward the vehicle or obstruction being approached.

The device may also be utilized in the daytime by regulating the shunt or variable resistor V to reduce the current supplied to the meter M to prevent damage thereto. When used in the daylight, if desired, a separate switch may be provided between the conductors 1B and 1 so that the light sources 12 need not be energized when the photoelectric cell circuit is closed. As the vehicle 20 approaches an obstruction or the vehicle 21 in the daylight and with the photoelectric cell circuit only closed, the vehicle 21 or obstruction will cast a shadow or otherwise shade the photoelectric cells as the vehicle 20 approaches the obstruction 21 so that the amount of current passing through the meter M will diminish and the needle of the meter will move toward a "zero" position thus indicating the distances between the vehicle 20 and obstruction 21 as the vehicle 20 is backed and so that the vehicle 20 can be stopped at a safe distance to prevent it from striking the obstruction. The meter dial may likewise obviously be calibrated with a second set of calibrations for this daylight use of the apparatus.

Obviously, if desired, a plurality of separate photoelectric cells could be mounted in circumferentially spaced relationship to one another around the barrel 13 and within the ring 22 in lieu of the single annular photoelectric cell 25 of each housing 14 and the annular group of photoelectric cells could then be electrically connected in parallel to the meter M. It will also be readily apparent that a single unit L-1 or L-2 could be utilized or the complete device could include more than two of said units. Likewise, the units could be mounted in other locations, as for example at the sides of the vehicle in addition to the back thereof. Various other modifications and changes are likewise contemplated and may obviously be resorted to, without departing from the spirit or scope of the invention as hereinafter defined by the appended claim.

I claim as my invention:

In an electronic distance gauging device, the combination with a vehicle, of a light source mounted on the vehicle in an exposed position adjacent an outer portion of the vehicle and outwardly from which vehicle portion the light rays from the light source are directed, photoelectric cell means disposed around said light source and arranged to receive the light rays from the light source reflected back toward the light source and said vehicle portion, means for shielding said photoelectric cell means from direct light rays from the light source, an electric circuit in which said photoelectric cell means is interposed, a microvolt movement type meter interposed in said electric circuit and supported on the vehicle in a position visible to the vehicle operator, light rays from said light source being adapted to be reflected from an object forming an obstruction to the vehicle toward which said vehicle portion is approaching whereby said photoelectric cell means is excited by the reflected light rays impinging thereagainst for energizing said electric circuit to produce a reading on the meter indicating the distance between the light source and the obstruction being approached, a switch for energizing and de-energizing said light source, a second switch interposed in said electric circuit of the photoelectric cell means for de-energizing said electric circuit, and said meter being provided with a shunt circuit including a variable resistor for varying the current supplied to the microvolt movement type meter whereby the photoelectric cell circuit may be energized in the daylight with said light source de-energized for producing a reading on the meter and whereby shadows from an obstruction toward which the vehicle portion is approaching will affect the photoelectric cell means and produce a variation in the meter reading to indicate that the vehicle portion is approaching an obstruction and the distance between the obstruction and said vehicle portion.

References Cited in the file of this patent

UNITED STATES PATENTS

| 2,317,652 | Toney | Apr. 27, 1943 |
| 2,522,637 | Pripeton | Sept. 19, 1950 |

FOREIGN PATENTS

| 648,548 | Germany | Aug. 7, 1937 |